March 29, 1966    J. MÜLLER    3,243,008
SUSPENSION FOR DRIVEN, SWINGING HALF-AXLES
Filed Oct. 23, 1963    3 Sheets-Sheet 1

INVENTOR
JOSEF MÜLLER
BY Dicke + Craig
ATTORNEYS

March 29, 1966  J. MÜLLER  3,243,008
SUSPENSION FOR DRIVEN, SWINGING HALF-AXLES
Filed Oct. 23, 1963  3 Sheets-Sheet 2
FIG. 5
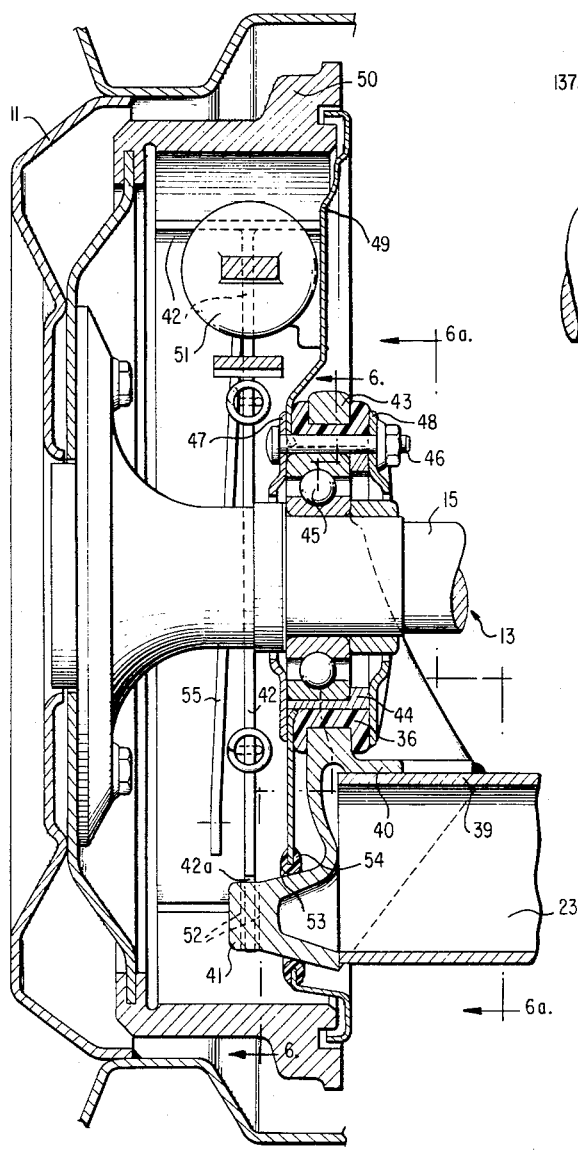
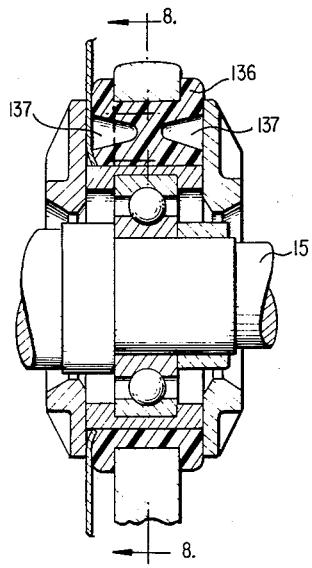
FIG. 7
INVENTOR
JOSEF MÜLLER
BY Dicke & Craig
ATTORNEYS

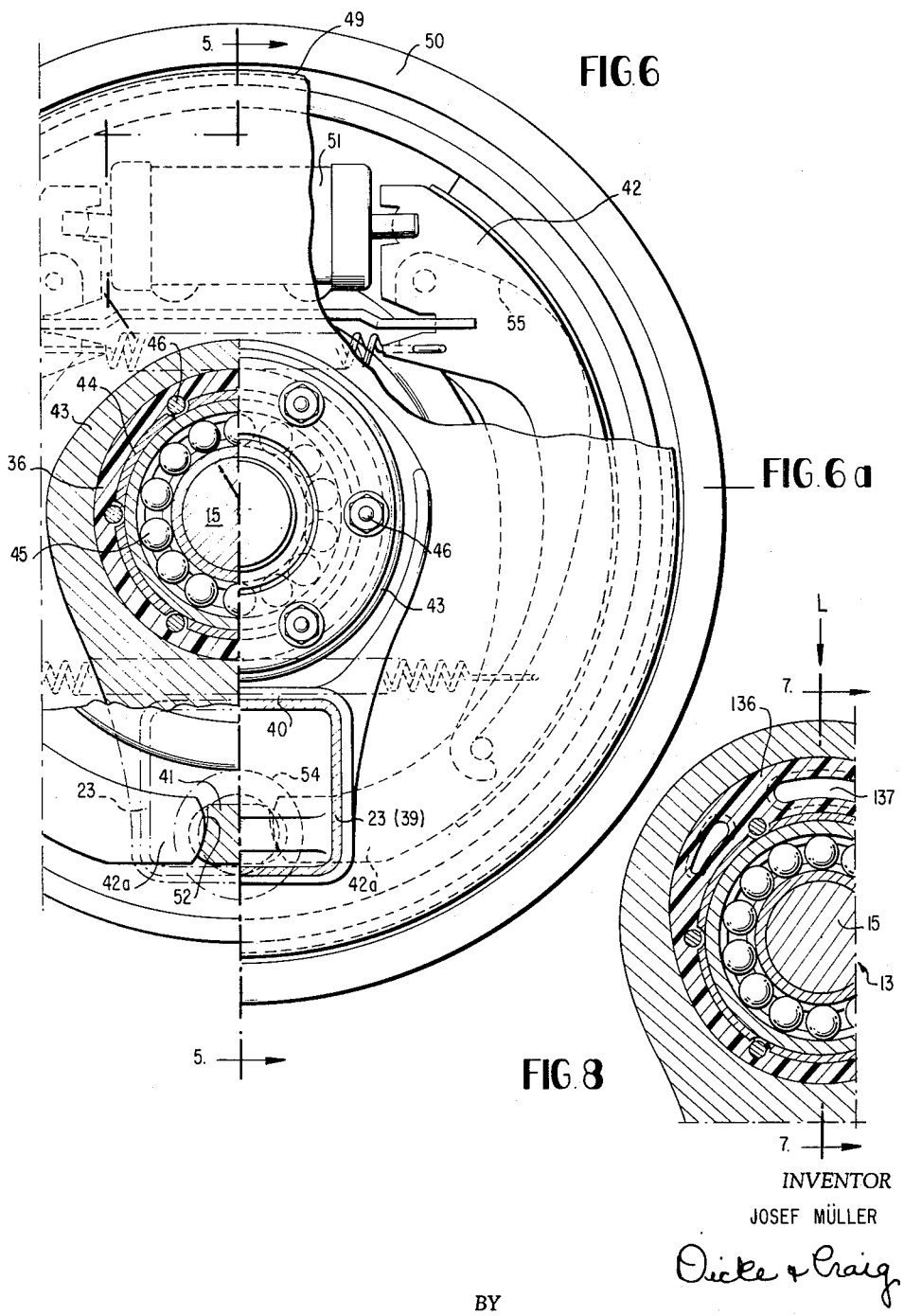

United States Patent Office 3,243,008
Patented Mar. 29, 1966

3,243,008
SUSPENSION FOR DRIVEN, SWINGING HALF-AXLES
Josef Müller, Stuttgart-Riedenberg, Germany, assignor to Daimler-Benz Aktiengesellschaft, Stuttgart-Unterturkheim, Germany
Filed Oct. 23, 1963, Ser. No. 318,435
Claims priority, application Germany, Nov. 8, 1962, D 40,218
13 Claims. (Cl. 180—73)

The present invention relates to an independent wheel suspension for vehicles, and more particularly to independent wheel suspension for use with swinging half-axles of motor vehicles, especially for use with swinging half-axles supporting the driven vehicle wheels.

The requirements which are made of a wheel suspension in motor vehicles, are oftentimes contradictory and difficult to combine with one another. On the one hand, the wheel suspension is to assure an exact wheel suspension, on the other, however, it is to exhibit sufficient elasticity with respect to the vehicle body in order to keep away as much as possible from the vehicle body the road noises and therewith to combine a good driving comfort with a good roadability.

Particular difficulties occur in this respect with said swinging half-axles supported in the driving direction by thrust guide arms. It is thereby necessary that the thrust guide arms, for example, inclined guide members supported on a wide base, are pivotally connected at the vehicle superstructure as precisely as possible in the bearing supports thereof, that is relatively hard bearings should be used as otherwise excessively large angular displacements of the wheels occur in the sense of an overstreering which is unfavorable for the driving characteristics. Such a hard bearing support, however, has the disadvantage that the road surface and rolling off noises are transmitted without damping or nearly without damping to the vehicle chassis frame and to the vehicle body.

The purpose of the present invention above all is to achieve a wheel suspension wherein, notwithstanding an elastic support of the thrust guide arms, the angular displacement of the wheels under the effect of longitudinal forces is as small as possible. Accordingly, the present invention essentially consists in that each of the thrust guide members is supported at the vehicle superstructure at two points arranged at a distance from one another in the transverse direction of the vehicle, and more particularly is supported at that bearing point which is at a greater distance from the vertical longitudinal vehicle plane extending through the connection of the swinging half-axle and thrust guide member, to be referred to hereinafter as the bearing point further away from the wheel, more elastically or yieldingly than in the bearing point closer to this plane, to be referred to hereinafter as bearing point near the wheel.

Preferably, the swinging half-axles and thrust guide members which pivot respectively about different axes, are connected with each other by means of a universal joint, especially in such a manner as to be yielding in all directions. The thrust guide arms thereby pivot preferably as inclined guide members about pivot axes extending obliquely to the vehicle longitudinal axis, whereby particularly advantageous driving characteristics with small change in the wheel tread are produced during spring deflections of the wheels if the swinging axes of the inclined guide members intersect the swinging planes of the swinging half axles on the vehicle side opposite the respective wheel.

The bearing suport of the thrust guide member may be provided within the bearing point nearer the wheel in a relatively rigid manner or with as hard as possible a rubber insert whereas it is provided in the bearing point further away from the wheel by means of a relatively soft rubber insert having relatively large elastic yieldingness. It can be achieved by the present invention that with impacts which act between the road surface and the vehicle, the thrust guide member is able to yield or give way about a vertical axis which extends approximately through the relatively hard bearing point nearer the wheel of the thrust guide member. The thrust guide member together with the associated wheel is displaced as a result thereof under the effect of these forces transversely to the vehicle longitudinal direction, that is, in the direction of the swinging half-axle, whereby the angular movement thereof and therewith of the wheel supported thereon may be reduced to a fraction of those angular movements which the wheel would carry out with uniformly elastic bearing supports of the thrust guide member.

In connection with the elastic connection of the swinging half-axle and thrust guide member according to a still further feature of the present invention, the thrust guide member is operatively connected at the swinging half-axle by interposition of an annular member surrounding the swinging half-axle and made of elastic material, for example, rubber. A simple connection of thrust guide member and swinging half-axle which reliably absorbs all forces is made possible by such an arrangement In order to avoid relative movements between the brake drum and the sheet cover supporting, for example, the brake actuating mechanism notwithstanding the elastic connection, the sheet cover is arranged at the swinging half-axle whereas the brake shoes are supported at the thrust guide member elastically connected with the swinging half-axle.

Accordingly, it is an object of the present invention to provide an independent wheel suspension, especially for swinging half-axles, which eliminates by simple means, the shortcomings and disadvantages encountered with the prior art constructions.

It is another object of the present invention to provide an independent wheel suspension for swinging half-axles which permits harmonization of the contradictory requirements of such suspension as regards good driving comfort and good roadability.

A further object of the present invention resides in the provision of an independent wheel suspension, especially for swinging half-axles which assures an accurate wheel suspension yet provides sufficient elasticity in order to absorb satisfactorily the road noises and shocks that occur during the drive.

Still another object of the present invention resides in the provision of an independent wheel suspension by means of thrust guide arms for swinging half-axles of a motor vehicle which effectively prevents any oversteering, any significantly large angular displacements of the wheels, and other undesired driving characteristics normally unavoidable with the prior art constructions.

Another object of the present invention resides in the provision of an independent wheel suspension for swinging half-axles of motor vehicles which is so constructed and arranged as to readily absorb longitudinally directed forces acting on the wheels without significant changes in the wheel track.

A still further object of the present invention resides in the provision of an elastic bearing support for the thrust guide members used in connection with an independent wheel suspension for swinging half-axles which provides excellent driving characteristics, yet is sufficiently elastic to assure satisfactory driving comfort.

Another object of the present invention resides in the provision of an independent wheel suspension for swinging half-axles which minimizes change in the wheel track.

These and further objects, features and advantages of the present invention will become more obvious from the following description when taken in connection with the accompanying drawing which shows, for purposes of illustration only, several embodiments in accordance with the present invention, and wherein:

FIGURE 5 is a longitudinal cross sectional view, on an enlarged scale, through the wheel bearing support taken along line 5—5 of FIGURE 1;

FIGURE 6 is a partial cross sectional view with the left half thereof taken along line 6—6 of FIGURE 5 and the right half thereof taken along line 6a—6a of FIGURE 5;

FIGURE 7 is a partial cross sectional view, taken along 7—7 of FIGURE 8, of a modified construction for the wheel bearing support in accordance with the present invention, and FIGURE 8 is a partial cross sectional view, taken along line 8—8 of FIGURE 7.

Figure 1:
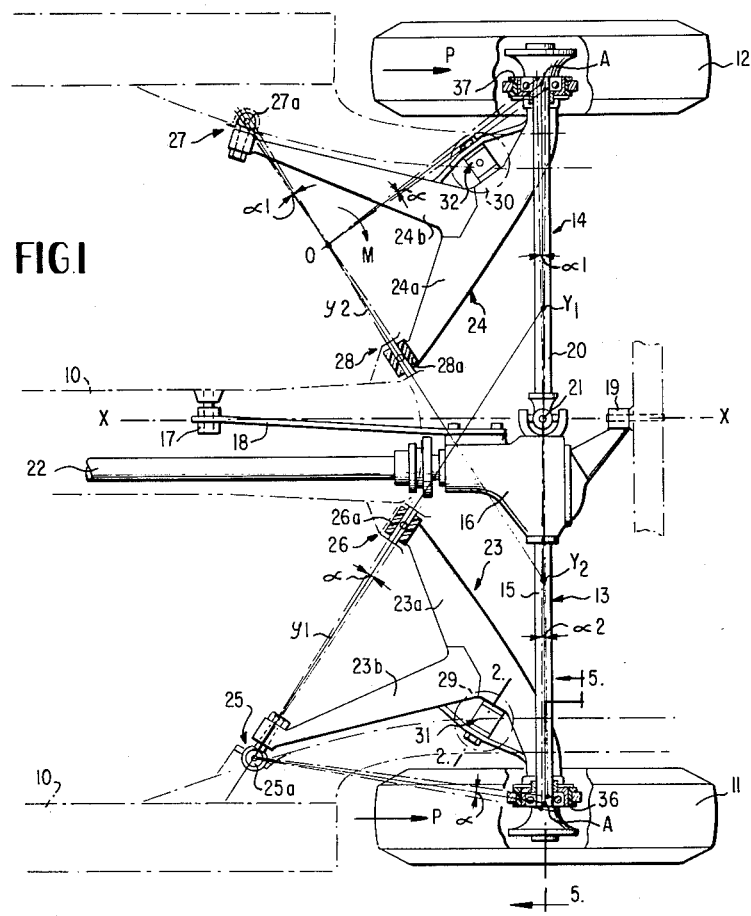
FIGURE 1 is a top plan view of the rear wheel suspension of a motor vehicle in accordance with the present invention.

Referring now to the drawing wherein like reference numerals are used throughout the various views to designate like parts, and more particularly to FIGURE 1, reference numeral 10 designates therein the frame or vehicle body of a self-supporting type body construction, to be referred to hereinafter as "vehicle superstructure." The rear wheels 11 and 12 of the vehicle are suspended at the vehicle superstructure 10 by means of swinging half-axles generally designated by reference numerals 13 and 14. The swinging half-axle 13 is thereby constituted by an axle drive shaft 15 rigidly connected with the wheel 11 and by the axle gear housing 16 which is swingably or pivotably suspended about the longitudinal axis $x$—$x$ at the vehicle superstructure by means of a leaf spring 18 supported at the vehicle superstructure in rubber cushions 17, on the one hand, and by means of a bearing eye 19 supported at the vehicle superstructure by the interposition of rubber, on the other. Instead of being supported in the bearing eye 19, the axle gear housing 16 or the swinging half-axle 13 may also be supported, for example, by means of a transverse member or the like on the thrust guide members generally designated by reference numerals 23 and 24 which will be described more fully hereinafter. The swinging half-axle 14 is constituted essentially by the other axle drive shaft 20 which is rigidly connected with the wheel 12 and is driven by means of a joint 21 from the axle gear within the housing 16. A forwardly disposed engine (not shown) drives the axle gear in the usual manner by way of a change-speed transmission and a Cardan shaft 22.

Each of the two swinging half-axles generally designated by reference numerals 13 and 14 is supported in the driving direction by means of a respective thrust guide arm generally designated by reference numerals 23 and 24. The thrust guide arms 23 and 24 are constructed as inclined guide members, that is, are supported in such a manner that they swing or pivot about the axes $y_1$ and $y_2$ disposed obliquely to the driving direction and extending either horizontally or slightly inclined, for example, inwardly and downwardly, whereby the axes $y_1$ and $y_2$ extend in such a manner that the points of intersection thereof with the vertical swinging plane of the swinging half-axles 13 and 14 are disposed on the vehicle side opposite the associated wheel, that is, at $Y_1$ and $Y_2$, respectively. As a result thereof, the effective length of the swinging half-axles is correspondingly increased which leads to a reduction of the change in wheel track of wheels in case of spring deflections.

The inclined thrust guide members 23 and 24 are made of a main arm 23a and 24a and of an auxiliary arm 23b and 24b, welded to a respective main arm, and more particularly are made of pressed or stamped sheet metal parts and constructed of star shape or fork shape. The inclined thrust guide members 23 and 24 are supported at the vehicle superstructure with the two leg portions thereof near the vehicle frame in two corresponding bearing points generally designated by reference numerals 25 and 26 and reference numerals 27 and 28, respectively, arranged at a distance from each other in the transverse direction of the vehicle, whereby the bearing points 25 and 27 form the bearing points of the thrust guide members 23 and 24 nearer the wheels and the bearing points 26 and 28 the bearing points of the thrust guide members 23 and 24 further away from the wheels. The bearing points 25 and 26 thereby determine the axis $y_1$ and the bearing points 27 and 28 the axis $y_2$.

Figure 2:
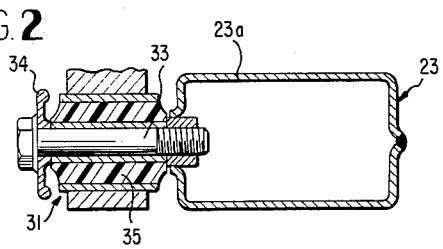
FIGURE 2 is a partial cross sectional view, on an enlarged scale, through a thrust guide member taken along line 2—2 of FIGURE 1.

For example, coil springs 29 and 30 serve for purposes of spring supporting the wheels which springs 29 and 30—together with shock absorbers—are pivotally supported at the lower ends thereof in a bearing eye generally designated by reference numeral 31 and 32, respectively, pivotally secured laterally at a corresponding thrust guide member 23 and 23, respectively. The support takes place thereby, as illustrated in FIGURE 2 for the bearing eye 31, under interposition of a transverse bolt 33 which is supported, on the one hand, in the side walls of the thrust guide member 23 or 24 and, on the other, in a connecting member 34 between two leg portions of the corresponding thrust guide member. For purposes of noise insulation, a rubber bushing 35 is inserted between the bearing bolt 33 and the bearing eye operatively associated therewith, for example, the bearing eye 31. The connection of the thrust guide members with the swinging half-axles takes place in a manner to be described more fully hereinafter under interposition of rubber rings 36 and 37.

Before describing more fully the support within the bearing points 25, 26 and 27, 28, respectively, the operation of a prior art construction with inclined thrust guide member according to FIGURE 4 which is to be improved by the present invention will be explained. With the prior art construction of FIGURE 4, the thrust or inclined guide arm 124 is assumed to be supported at the vehicle superstructure 110 in the two bearing points 127 and 128 under interposition of two equally soft rubber cushions. The vehicle wheel 112 is, in contrast to the present invention, supported on the thrust guide arm 124. In contradistinction thereto, the axle drive shaft 120 carries out no guide function at all with respect to the wheel since it is operatively connected as double jointed shaft by means of the joint 121a with the axle gear 116, for instance, secured at the vehicle superstructure as well as by means of the joint 121b with the wheel 112.

A force acting on the wheel 112 in the direction of arrow P (FIGURE 4) is transmitted exclusively through the thrust guide arm 124 by way of the bearing points 127 and 128 to the vehicle superstructure. The moment occurring as a result thereof seeks to rotate the thrust guide arm 124 in the direction of arrow M about a vertical axis O which is disposed approximately in the center between the bearing points 127 and 128 whereby the rubber cushion or sleeve within bearing 127 is loaded or stressed in the direction of arrow $p_1$ and the rubber cushion or sleeve in bearing 128 in the direction of arrow $p_2$. If, for example, the thrust guide arm 124—for instance with a permissive elasticity of ±5 mm. in the bearing points 127 and 128—carries out an angular movement of the magnitude $\alpha$ which, in a practical realization, may amount 1°, then the wheel 112 carries out an angular displacement or movement of equal magnitude.

Figure 4:
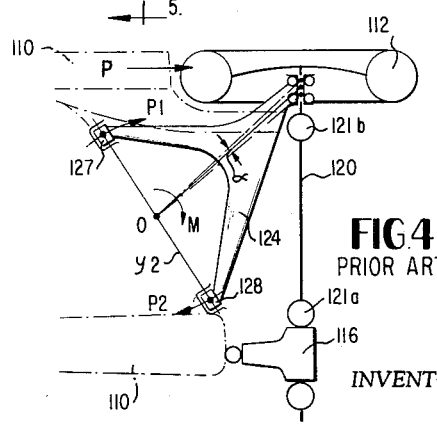
FIGURE 4 is a schematic plan view of a prior art rear wheel suspension with a wheel supported on a thrust guide member.

It is further assumed now that in the place of the construction according to FIGURE 4, a construction is provided in which through the two bearing points 127 and 128 again have equally soft rubber elements, the wheel 112 is not supported on the thrust guide arm 124, but instead on a swinging half-axle which is constituted by the axle drive shaft. Such a construction corresponds to that if FIGURE 1 insofar as it is assumed that the thrust guide members 23 and 24 are each supported so softly in the bearing points 25 and 27 nearer the wheels as in the bearing points 26 and 28 farther away from the wheels. The angular movements for this case are illustrated in the upper half of FIGURE 1. If the thrust guide arm 24 again carries out an angular movement $\alpha$, for example, of about 1°, under the influence of the force P and therewith—by way of the rubber ring 37—of a torque M in that the thrust guide arm 24 rotates about the vertical axis O, then the angular movement of the swinging half-axle only amounts to the angle $\alpha_1$ which, in the illustrated arrangement, is approximately half as large as the angle $\alpha$. Hence, already with such an arrangement, a considerable improvement is obtained in the kinematic behavior of the wheel with respect to the longitudinal forces or impacts P.

Still more favorable, however, is the behavior of the wheel with constructions according to the present invention as illustrated in FIGURE 1. As may be seen from this figure, the bearing points 25 and 27 are constructed relatively inelastically or with only slight elasticity, in that the thrust guide arms 23 and 24 are pivotally secured at the vehicle superstructure 10 by means of similar ball joints 25a and 27a. The bearing support at the vehicle superstructure and the bearing points 26 and 28 takes place, in contrast thereto, by the interposition of relatively soft rubber cushions 26a and 28a so that the thrust guide members are able to yield within these bearing points radially with respect to the respective swinging axes $y_1$ and $y_2$. Consequently, the thrust guide arms 23 and 24 will—by reason of the relatively rigid bearing support within the points 25 and 27—yield under the influence of a force P at the wheels 11 and 12 about a vertical axis extending through the bearing points 25 and 27 nearer the wheels, as is illustrated in the lower part of FIGURE 1 with respect to the thrust guide arm 23. If, under the assumption of the same yieldingness within the bearing points 26, the thrust guide arm 23 again carries out an angular movement or displacement through the angle $\alpha$, then the point A at the place of connection of the thrust guide members with the swinging half-axles carry out a movement which is disposed essentially within the swinging plane of the swinging half-axles, that is, is disposed within a plane perpendicular to the driving direction, as indicated by the angle $\alpha$ for the point A at the wheel 11. The swinging half-axle 13—and corresponding also the swinging half-axle 14—carries out, therefore, only an angular movement merely of the magnitude $\alpha_2$ which approaches the value zero and in the illustrated embodiment, amounts to approximately ±10 minutes, that is, ⅙ of the angle $\alpha$. If the bearing points 25 and 27 approach even more closely the vertical longitudinal plane passing through point A, then the angle $\alpha$ may be still further reduced.

Figure 3:
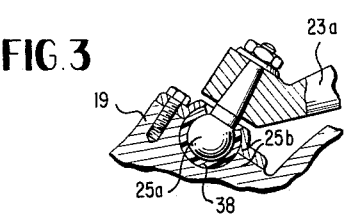
FIGURE 3 is a partial cross sectional view, on an enlarged scale, of one embodiment of a bearing support for the thrust guide member near the wheel.

Altogether, it may be seen that the reduction of the steering or deflection angle $\alpha_2$ of the wheel may be attributed, on the one hand, to the type of the wheel support on the swinging half-axle 13 or 14 and, on the other, to the differently hard bearing supports of the thrust guide member in the bearing places 25, 26 or 27, 28. In place of a completely rigid or stiff bearing support of the thrust guide member in the bearing places 25 and 27, a certain yieldingness may also be provided in these joints as indicated, for example, in FIGURE 3, whereby a rubber layer 38 is inserted between the ball 25a and the socket 25b of the joint at the vehicle superstructure which rubber insert 38, on the one hand, far-reachingly absorbs shocks, vibrations and noises, yet on the other, permits a yieldingness between the thrust guide member and the vehicle superstructure, particularly in the vehicle longitudinal direction of the vehicle only to a slight extent.

FIGURES 5 and 6 illustrate the connection for example, between the thrust guide arm 23 and the wheel 11 or the axle drive shaft 15 essentially forming the swinging half-axle. A bearing piece 40 is placed over the tubularly-shaped end 39 of the thrust guide member 23, for example, is welded thereon which, on the one hand, carries a support pin 41 for the brake members, for example, the brake shoes 42, and, on the other, is provided with a bearing eye 43 into which is inserted the aforementioned annularly-shaped rubber cushion 36. The rubber cushion 36 supports along the inside thereof, by the interposition of a metal bushing 44, a ball bearing 45 within which is supported the axle drive shaft 15 rigidly connected with the wheel 11.

Connecting bolts 46 serve for clamping the rubber ring 36 between the disks 47 and 48, arranged axially with respect to the rubber ring 36, and simultaneously retain the sheet covering 49 covering the brake in the direction toward the inside of the wheel so that the sheet covering 49 does not participate in the relative movement of the thrust guide arm 23 relative to the axle shaft 15 or to the wheel and therewith relative to the brake drum 50, and like the brake drum 50 also forms kinematically a part of the swinging half-axle. The brake actuating mechanism, for example, the brake cylinder 51 of a hydraulic shoe brake is secured at the sheet covering 49.

The brake shoes 42 are supported, by means of the band-shaped ends 42a thereof engaging in grooves 52, on the support pin 41 with lateral play so that in case of relative movements between the thrust guide arm and the sheet covering 49, the brake shoes may yield or give way somewhat laterally. The support pin 41 may serve simultaneously therewith to prevent any rotation of the sheet covering 49 about the axis of the drive shaft 15. In order to enable the support pin 41 for the brake shoes 42 to extend through the sheet covering 49, the latter is provided with an aperture 53 which is closed by a rubber ring 54 at the sheet covering 49 whereby the space accommodating the brake radially inside the wheel is sealed against the thrust guide arm 23 elastically movable with respect thereto. For purposes of actuation of the brake shoes 42 by a hand brake, levers 55 may be supported in the usual manner adjacent the brake shoes 42.

If, for purposes of absorbing the relative movement between the thrust guide member and the swinging half-axle or axle shaft 15, a particularly yielding connection is to be established, then this may be achieved by a rubber ring 136 (FIGURES 7 and 8) of particularly large dimensions. The rubber ring 136 may have the same cross section or different cross sections along the circumference thereof as shown, for example, with respect to different cross sections in FIGURES 7 and 8. In this case, the yieldingness is particularly large in the vertical load direction L in that the rubber ring 136 has a considerably larger radial width on its top side than at the bottom side or in the horizontal direction thereof in which the brake forces are to be absorbed. Apertures 137 may further increase the softness or yieldingness of the rubber ring 136 at the desired places.

Possibly also the rubber ring may be so constructed and arranged that a particularly large yieldingness in the axial direction of the shaft 15 is present in order to compensate for the axial movement between the thrust guide arm and the swinging half-axle. However, this compensation can also take place in that the axle shaft 15 or 20 is supported so as to be axially displaceable either within itself or within the axle gear housing 16.

If rubber cushions are provided in each bearing point 25 and 26 or 27 and 28, then the arrangement is appropriately made by conventional means in such a manner that a yieldingness is provided in the bearing points 25 and 27 principally in the axial direction of the swinging axes $y_1$ and $y_2$ (or in the transverse direction of the vehicle), and in the bearing points 26 and 28 principally radially to the aforementioned swinging axes (or in the vehicle longitudinal direction) which also makes possible the obtainment of the desired effect of the present invention While I have shown and described several embodiments in accordance with the present invention, it is understood that the same is not limited thereto, but is susceptible of many changes and modifications within the spirit and scope thereof as known to a person skilled in the art, and I therefore do not wish to be limited to the details shown and described herein, but intend to cover all such changes and modifications as are encompassed by the scope of the appended claims.

I claim:

1. A wheel suspension for motor vehicles having a vehicle superstructure by means of swinging half-axles and supports of said half-axles in the driving direction by way of thrust guide members, comprising:
   swinging half-axle means,
   thrust guide means,
   means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means,
   said second bearing means providing a relatively rigid bearing support of said thrust guide means and said first bearing means providing a bearing support with relatively large elastic yieldingness,
   said second bearing means including a relatively hard rubber insert and said first bearing means including a relatively soft rubber insert.

2. A wheel suspension for motor vehicles having a vehicle susperstructure by means of swinging half-axles and supports of said half-axles in the driving direction by way of thrust guide members, comprising:
   swinging half-axle means,
   thrust guide means,
   means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means,
   means to enable each of said swinging half-axle means to swing about an approximately longitudinally extending axis,
   and connecting means operatively connecting said swinging half-axle means with said thrust guide means to enable substantially universal relative movement therebetween,
   said connecting means including means to provide universal yielding movement between a swinging half-axle means and a respective thrust guide means,
   the pivot axes of said thrust guide means constructed as inclined guide members extending obliquely to the vehicle longitudinal axis and intersecting the swinging plane of the swinging half-axle means in relation to the respective wheel supported by a corresponding thrust guide means on the opposite vehicle side beyond the swinging axis of the associated swinging half-axle means,
   said second bearing means providing a relatively rigid bearing support of said thrust guide means and said first bearing means providing a bearing support with relatively large elastic yieldingness,
   said second bearing means including a relatively hard rubber insert and said first bearing means including a relatively soft rubber insert.

3. A wheel suspension for motor vehicles having a vehicle superstructure by means of swinging half-axles and supports of said half-axles in the driving direction by way of thrust guide members, comprising:
   swinging half-axle means,
   thrust guide means,
   means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding at least radially to the respective pivot axis thereof than the second bearing means,
   means to enable each of said swinging half-axle means to swing about an approximately longitudinally extending axis,
   and connecting means operatively connecting said swinging half-axle means with said thrust guide means to enable substantially universal relative movement therebetween,
   said connecting means including means to provide universal yielding movement between a swinging half-axle means and a respective thrust guide means,
   the pivot axes of said thrust guide means constructed as inclined guide means extending obliquely to the vehicle longitudinal axis and intersecting the swinging plane of the swinging half-axle means in relation to the respective wheel supported by a corresponding thrust guide means on the opposite vehicle side beyond the swinging axis of the associated swinging half-axle means,
   said second bearing means providing a relatively rigid bearing support of said thrust guide means and said first bearing means providing a bearing support with relatively large elastic yieldingness,
   said second bearing means including a relatively hard rubber insert and said first bearing means including a relatively soft rubber insert,
   said thrust guide means including a main arm connecting the bearing point of said first bearing means with the bearing support at the corresponding swinging half-axle means and an auxiliary arm rigidly connected with the main arm, both arms being constituted by hollow stamped sheet metal parts.

4. A wheel suspension for motor vehicles having a vehicle superstructure by means of swinging half-axles and supports of the half-axles in the driving direction by way of thrust guide members, comprising:
   swinging half-axle means,
   thrust guide means,
   means for pivotally supporting each of said thrust guide means at said vehicle superstructure in two bearing points arranged at a distance from one another in the vehicle transverse direction and defining a respective pivot axis including first bearing means disposed more remote from the respective wheel in said transverse direction and second bearing means disposed nearer the respective wheel in said transverse direction, said first bearing means being more yielding than said second bearing means, means to enable each of said swinging half-axle means to swing about an approximately longitudinally extending axis in such a manner as to yield also slightly about a vertical axis, and connecting means operatively connecting said swinging half-axle means with said thrust guide means to enable universal relative movement therebetween, said connecting means including means to provide universal yielding movement between a swinging half-axle means and a respective thrust guide means, said pivot axes extending obliquely to the vehicle longitudinal axis and intersecting the swinging plane of the swinging half-axle means in relation to the respective wheel supported by a corresponding thrust guide means on the opposite vehicle side beyond the swinging axis of the associated swinging half-axle means, said thrust guide means including a main arm connecting the bearing point of said first bearing means with the bearing support at the corresponding swinging half-axle means and an auxiliary arm rigidly connected with a respective main arm, and both arms being constituted by hollow stamped sheet metal parts, means for spring-supporting a respective wheel at the vehicle superstructure having spring means, shock absorber means, and means operatively connecting the spring-supporting means at a respective thrust guide means by the interposition of elastic means including a transverse bolt member constituting a connecting pin supported, on the one hand, in the main arm of a thrust guide means and in a connecting web portion between the respective main arm and auxiliary arm thereof.

5. A wheel suspension for motor vehicles having a vehicle superstructure by means of swinging half-axles and supports of the half-axles in the driving direction by way of thrust guide members, comprising:

swinging half-axle means, thrust guide means, means for pivotally supporting each of said thrust guide means at said vehicle superstructure in two bearing points arranged at a distance from one another in the vehicle transverse direction including first bearing means disposed more remote from the respective wheel in said transverse direction and second bearing means nearer the respective wheel in said transverse direction, said first bearing means being more yielding than said second bearing means, means to enable each of said swinging half-axle means to swing about an approximately longitudinally extending axis, and connecting means operatively connecting said swinging half-axle means with said guide means to enable universal relative movement therebetween, said connecting means including means to provide universal yielding movement between said swinging half-axle means and said guide means, and means for supporting the axle gear housing forming part of one swinging half-axle means at said vehicle superstructure including an elastic thrust arm arranged generally in the vehicle longitudinal direction and formed by an upright leaf spring.

6. A wheel suspension for motor vehicles having a vehicle superstructure by means of swinging half axles and supports of the half axles in the driving direction by way of thrust guide members, comprising swinging half axle means, thrust guide means, means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means, connecting means operatively connecting said swinging half axle means with said thrust guide means to enable universal relative movement therebetween, said connecting means connecting said thrust guide means with said swinging half axle means by the interposition of substantially annularly-shaped means made of elastic material and surrounding in a ring-shaped manner the respective swinging half axle means, a brake mechanism including brake members, and means for supporting said brake members with play at said thrust guide means, cover means, brake actuating means supported on said cover means, said cover means closing the brake mechanism toward the vehicle inside, said cover means being rotatably supported on a respective swinging half axle means and non-yieldingly connected therewith.

7. A wheel suspension for motor vehicles having a vehicle superstructure by means of swinging half axles and supports of the half axles in the driving direction by way of thrust guide members, comprising swinging half axle means, thrust guide means, means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means, connecting means operatively connecting said swinging half axle means with said thrust guide means to enable universal relative movement therebetween, said connecting means connecting said thrust guide means with said swinging half axle means by the interposition of substantially angularly-shaped means made of elastic material and surrounding in a ring-shaped manner the respective swinging half axle means, a brake mechanism including brake members, and means for supporting said brake members with play at said thrust guide means, cover means, brake actuating means supported on said cover means, said cover means closing the brake mechanism toward the vehicle inside, said cover means being rotatably supported on a respective swinging half axle means and non-yieldingly connected therewith, roller bearing means for supporting the axle shaft forming part of a swinging half axle means, bearing ring means receiving said roller bearing means and operatively connected with a respective thrust guide means by the interposition of an elastic annularly-shaped means, said bearing ring means supporting simultaneously said cover means, said cover means being provided with an aperture through which extends a support pin of the thrust guide means supporting thereon with play the brake members, and rubber ring means for sealing the gap between said supporting pin and the rim of said aperture.

8. A wheel suspension for motor vehicles having a vehicle superstructure by means of swinging half axles and supports of the half axles in the driving direction by way of thrust guide members, comprising
- swinging half axle means,
- thrust guide means,
- means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means,
- connecting means operatively connecting said swinging half axle means with said thrust guide means to enable universal relative movement therebetween,
- said connecting means connecting said thrust guide means with said swinging half axle means by the interposition of substantially annularly-shaped means made of elastic material and surrounding in a ring-shaped manner the respective swinging half axle means,
- a brake mechanism including brake members, and means for supporting said brake members with play at said thrust guide means,
- cover means, brake actuating means supported on said cover means, said cover means closing the brake mechanism toward the vehicle inside, said cover means being rotatably supported on a respective swinging half axle means and non-yieldingly connected therewith,
- roller bearing means for supporting the axle shaft forming part of a swinging half axle means, bearing ring means receiving said roller bearing means and operatively connected with a respective thrust guide means by the interposition of an elastic annularly-shaped means, said bearing ring means supporting simultaneously said cover means,
- said cover means being provided with an aperture through which extends a support pin of the thrust guide means supporting thereon with play the brake members, and rubber ring means for sealing the gap between said supporting pin and the rim of said aperture,
- the annularly-shaped means surrounding the swinging half axle means being constructed particularly yielding for the connection of the thrust guide means at the swinging half axle means at least on one side thereof.

9. A wheel suspension for motor vehicles having a vehicle superstructure by means of swinging half axles and supports of the half axles in the driving direction by way of thrust guide members, comprising
- swinging half axle means,
- thrust guide means,
- means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means,
- means to enable each of said swinging half axle means to swing about an approximately longitudinally extending axis,
- connecting means operatively connecting said swinging half axle means with said thrust guide means to enable universal relative movement therebetween,
- said pivot axes extending obliquely to the vehicle longitudinal axis and intersecting the swinging plane of the swinging half axle means in relation to a respective wheel supported by the corresponding guide means on the opposite vehicle side beyond the swinging axis of the associated swinging half axle means,
- said connecting means connecting said thrust guide means with said swinging half axle means by the interposition of substantially annularly-shaped means made of elastic material and surrounding in a ring-shaped manner the respective swinging half axle means,
- a brake mechanism including brake members, and means for supporting said brake members with play at said thrust guide means,
- cover means, brake actuating means supported on said cover means, said cover means closing the brake mechanism toward the vehicle inside, said cover means being rotatably supported on a respective swinging half axle means and non-yieldingly connected therewith,
- roller bearing means for supporting the axle shaft forming part of a swinging half axle means, bearing ring means receiving said roller bearing means and operatively connected with a respective thrust guide means by the interposition of an elastic annularly-shaped means, said bearing ring means supporting simultaneously said cover means,
- said cover means being provided with an aperture through which extends a support pin of the thrust guide means supporting thereon with play the brake members, and rubber ring means for sealing the gap between said supporting pin and the rim of said aperture,
- the annularly-shaped means surrounding the swinging half axle means being constructed particularly yielding for the connection of the thrust guide means at the swinging half axle means at least on one side thereof by a relatively large cross section and by the provision of apertures in said one side.

10. A wheel suspension for motor vehicles having a vehicle superstructure by means of swinging half axles and supports of the half axles in the driving direction by way of thrust guide members, comprising
- swinging half axle means,
- thrust guide means,
- means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse dircteion, said first bearing means being more yielding than the second bearing means,
- connecting means operatively connecting said swinging half axle means with said thrust guide means to enable universal relative movement therebetween,
- said connecting means connecting said thrust guide means with said swinging half axle means by the interposition of substantially annularly-shaped means made of elastic material and surrounding in a ring-shaped manner the respective swinging half axle means,
- ball bearing means for supporting the axle shaft forming part of a swinging half axle means, bearing ring means receiving said ball bearing means and operatively connected with a respective thrust guide means by the interposition of an elastic annularly-shaped means, said bearing ring means supporting simultaneously said cover means.

11. A wheel suspension for motor vehicles having a vehicle superstructure by means of swinging half-axles and supports of said half-axles in the driving direction by way of thrust guide members, comprising:
- swinging half-axle means,
- thrust guide means, means for pivotally supporting each of said thrust guide means at said vehicle superstructure in two bearing points arranged at a distance from one another in the vehicle transverse direction and defining a pivot axis including first bearing means disposed more remote from the respective wheel in said transverse direction and second bearing means disposed nearer the respective wheel in said transverse direction, said first bearing means being more yielding than the second bearing means, means to enable each of said swinging half-axle means to swing about an approximately longitudinally extending axis, and connecting means operatively connecting said swinging half-axle means with said thrust guide means to enable substantially universal relative movement therebetween, said connecting means including means to provide universal yielding movement between a swinging half-axle means and a respective thrust guide means, said second bearing means providing a relatively rigid bearing support of said thrust guide means and said first bearing means providing a bearing support with relatively large elastic yieldingness, said second bearing means including a relatively hard rubber insert and said first bearing means including a relatively soft rubber insert.

12. A wheel suspension for motor vehicles having a vehicle superstructure by means of swinging half-axles and supports of the half-axles in the driving direction by way of thrust guide members, comprising:

swinging half-axle means, thrust guide means, means for pivotally supporting each of said thrust guide means at said vehicle superstructure in two bearing points arranged at a distance from one another in the vehicle transverse direction and defining a respective pivot axis including first bearing means disposed more remote from the respective wheel in said transverse direction and second bearing means disposed nearer the respective wheel in said transverse direction, said thrust guide means including a main arm connecting the bearing point of said first bearing means with the bearing support at the corresponding swinging half-axle means and an auxiliary arm rigidly connected with a respective main arm, and both arms being constituted by hollow stamped sheet metal parts, means for spring-supporting a respective wheel at the vehicle superstructure having means operatively connecting the spring-supporting means at a respective thrust guide means by the interposition of elastic means including a transverse bolt member constituting a connecting pin supported, on the one hand, in the main arm of a thrust guide means and in a connecting web portion between the respective main arm and auxiliary arm thereof.

13. A wheel suspension for motor vehicles having a vehicle superstructure by means of swinging half-axles and supports of the half-axles in the driving direction by way of thrust guide members, comprising:

swinging half-axle means, thrust guide means, means for pivotally supporting each of said thrust guide means at said vehicle superstructure in two bearing points arranged at a distance from one another in the vehicle transverse direction and defining a pivot axis, connecting means operatively connecting said swinging half-axle means with said thrust guide means to enable universal relative movement therebetween, said connecting means connecting said thrust guide means with said swinging half-axle means by the interposition of substantially annularly shaped means made of elastic material and surrounding in a ring-shaped manner the respective swinging half-axle means, a brake mechanism including brake members, and means for supporting said brake members with play at said thrust guide means, cover means, brake actuating means supported on said cover means, said cover means closing the brake mechanism toward the vehicle inside, said cover means being rotatably supported on a respective swinging half-axle means and non-yieldingly connected therewith, ball bearing means for supporting the axle shaft forming part of a swinging half-axle means, bearing ring means receiving said ball bearing means and operatively connected with a respective thrust guide means by the interposition of an elastic annularly shaped means, said bearing ring means supporting simultaneously said cover means, said cover means being provided with an aperture through which extends a support pin of the thrust guide means supporting thereon with play the brake members, and rubber ring means for sealing the gap between said supporting pin and the rim of said aperture, the annularly shaped means surrounding the swinging half-axle means being constructed particularly yielding for the connection of the thrust guide means at the swinging half-axle means at least on one side thereof.

References Cited by the Examiner
UNITED STATES PATENTS

| | | | |
|---|---|---|---|
| 1,668,295 | 5/1928 | Weinhard | 180—85 |
| 2,149,122 | 2/1939 | McCall | 180—85 X |
| 2,372,744 | 4/1945 | Sherman | 267—20 |
| 2,988,161 | 6/1961 | Herr | 180—73 |
| 3,064,749 | 11/1962 | Muller | 180—73 |
| 3,075,786 | 1/1963 | Freers et al. | 280—96.2 |

BENJAMIN HERSH, *Primary Examiner.*

A. HARRY LEVY, *Examiner.*

E. E. PORTER, *Assistant Examiner.*